Aug. 23, 1966    D. J. ROBINSON    3,268,857
METHOD AND APPARATUS FOR DETECTING AND DISPLAYING THE
DIFFERENCE BETWEEN SUCCESSIVE PEAK VALUES
OF A SEISMIC SIGNAL
Filed Aug. 17, 1962    3 Sheets-Sheet 1

DONALD J. ROBINSON INVENTOR.

BY James E. Reed
ATTORNEY

DONALD J. ROBINSON INVENTOR.

BY James E. Reed
ATTORNEY

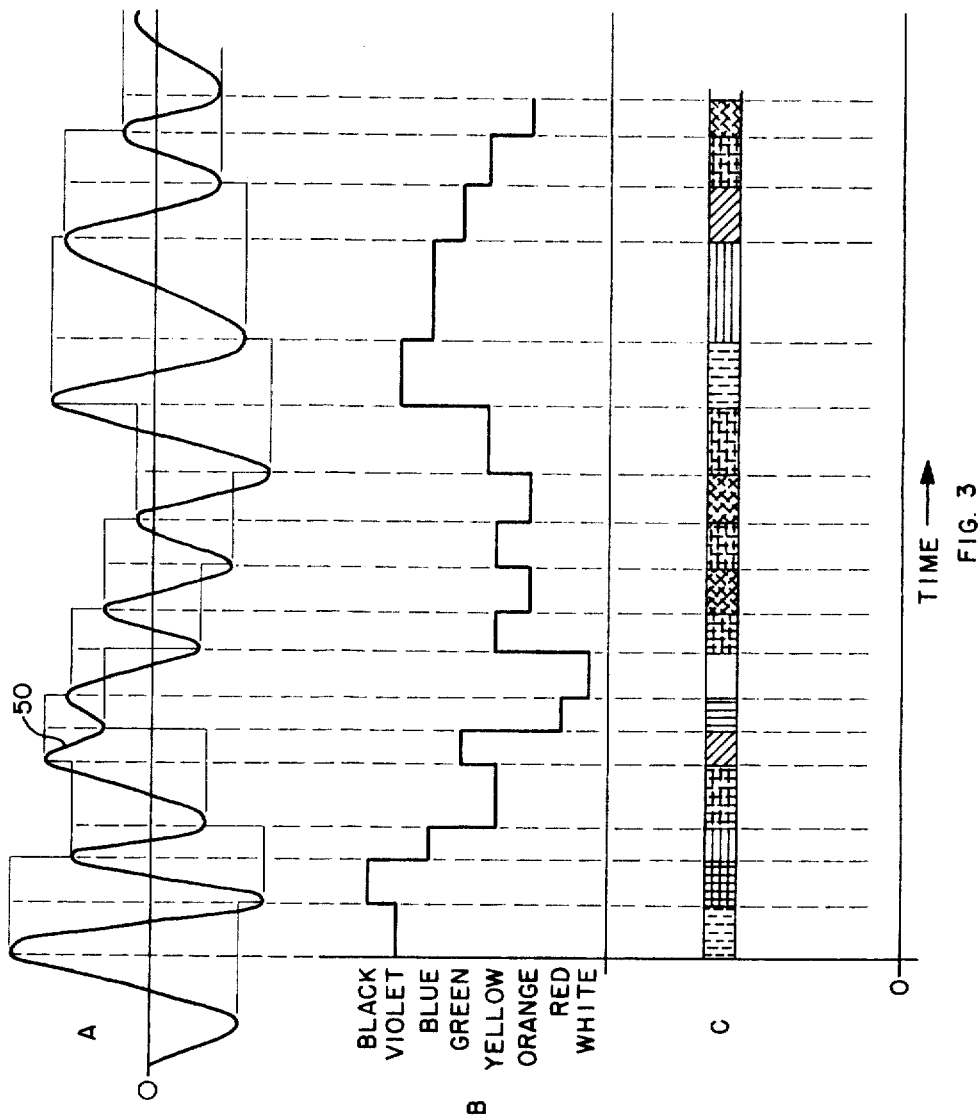

United States Patent Office 3,268,857
Patented August 23, 1966

3,268,857
METHOD AND APPARATUS FOR DETECTING AND DISPLAYING THE DIFFERENCE BETWEEN SUCCESSIVE PEAK VALUES OF A SEISMIC SIGNAL
Donald J. Robinson, Tulsa, Okla., assignor, by mesne assignments, to Esso Production Research Company, Houston, Tex., a corporation of Delaware
Filed Aug. 17, 1962, Ser. No. 217,714
9 Claims. (Cl. 340—15.5)

The present invention relates to seismic prospecting and is particularly concerned with an improved system for recording seismic signals to facilitate the detection of changes in signal amplitude.

Seismic prospecting systems currently in use are based on measurement of the time intervals required for impulses generated at or near the earth's surface to travel to subsurface discontinuities and be reflected or refracted back to the surface. The signals detected at the surface contain sequential peaks in amplitude due to the reflection or refraction of energy from particular discontinuities. By recording the detected energy and comparing the arrival times of corresponding peaks in amplitude in signals detected at several different points on the surface, corrections having been made for differences in surface elevation and variations in the spacing of the detection points from the impulse points, changes in the elevation or profile of particular strata can be recognized. Such changes frequently indicate the existence of anticlines, faults, salt domes and other structural traps in which crude oil or natural gas may be found.

Seismic signals detected during prospecting operations of the type referred to above are normally recorded as oscillographic traces, variable area traces or variable density traces. The use of variable density recording systems is particularly advantageous because of the ease with which seismic sections representing large cross-sections of the earth can be prepared. Each variable density trace consists of alternate light and dark bands which extend across the trace axis. The density or intensity of the trace at a particular point is a function of signal amplitude. High amplitudes are indicated by black or white areas; while lower amplitudes are shown by intermediate shades of gray. By adjusting the width of individual variable density traces to correspond to the horizontal distance between detection points on the earth's surface and then mounting the traces so that prominent reflections continue across adjacent traces, a reasonably accurate representation of the subsurface strata in the area investigated can be obtained. Such multitrace records facilitate the detection of changes in the elevations or profiles of particular strata which may indicate the existence of anticlines and similar structural traps.

In recent years increasing emphasis has been placed on stratigraphic traps as potential sources of crude oil and natural gas. Such traps differ from the structural traps referred to earlier in that they are characterized by variations in the permeability, porosity and thickness of particular subsurface strata and are not usually evidenced by pronounced changes in the elevations or profiles of the strata. Such traps are therefore difficult to locate by conventional seismic prospecting methods. Model studies and field data have shown, however, that subsurface variations indicating the possible existence of stratigraphic traps are often evidenced by lateral changes in signal amplitude on multiple-trace seismic records. These changes are much less pronounced than those indicating the arrival of energy reflected from interfaces beneath the surface and cannot readily be detected by simply comparing one trace with another. Some progress toward facilitating their detection has been made through the development of improved variable area, variable density and variable color recording systems but in general such systems still leave much to be desired. For this reason, lateral changes in signal amplitude on multiple-trace records have not been used extensively as a means for detecting stratigraphic traps.

It is therefore an object of the present invention to provide an improved system for the recording of signals obtained during seismic prospecting operations. A further object is to provide a method and apparatus for recording seismic signals which will facilitate the detection of small changes in the amplitude of the recorded signals. Another object is to provide a recording system which will permit lateral changes in amplitude that may indicate the existence of stratigraphic traps to be detected more readily on multiple-trace seismic records than has generally been possible in the past. Still other objects will become apparent as the invention is described in greater detail hereafter.

In accordance with the invention, it has now been found that many of the difficulties encountered in the past in detecting small changes in the amplitude of seismic signals can be alleviated by recording such signals as photographic traces on which changes in the difference between adjacent positive and negative peak amplitude values are shown in sharply contrasting colors or intensities. By generating a series of control pulses which coincide with the positive and negative peaks in the input signal, utilizing these to sample and hold the positive and negative peak values, and thereafter subtracting negative peak values from the positive peak values, a rectangular waveform in which adjacent amplitude values correspond to the differences between positive and negative peak values in the input signal can thus be obtained. This waveform can then be recorded in variable density or variable color form. Because changes in the differences between adjacent positive and negative peak values are often more pronounced than changes in the values themselves, the system of the invention often results in more pronounced record changes than are obtained with conventional recording systems. This facilitates the recognition of small lateral changes in amplitude on multiple-trace seismic records and may make possible the detection of stratigraphic traps and other anomalies which would otherwise pass unnoticed.

The exact nature and objects of the invention can best be understood by referring to the following detailed description of a preferred embodiment and to the accompanying drawing, in which:

FIGURE 3 is a graphical representation of waveforms and a seismic trace produced with the apparatus of FIGURE 1.

Figure 1:
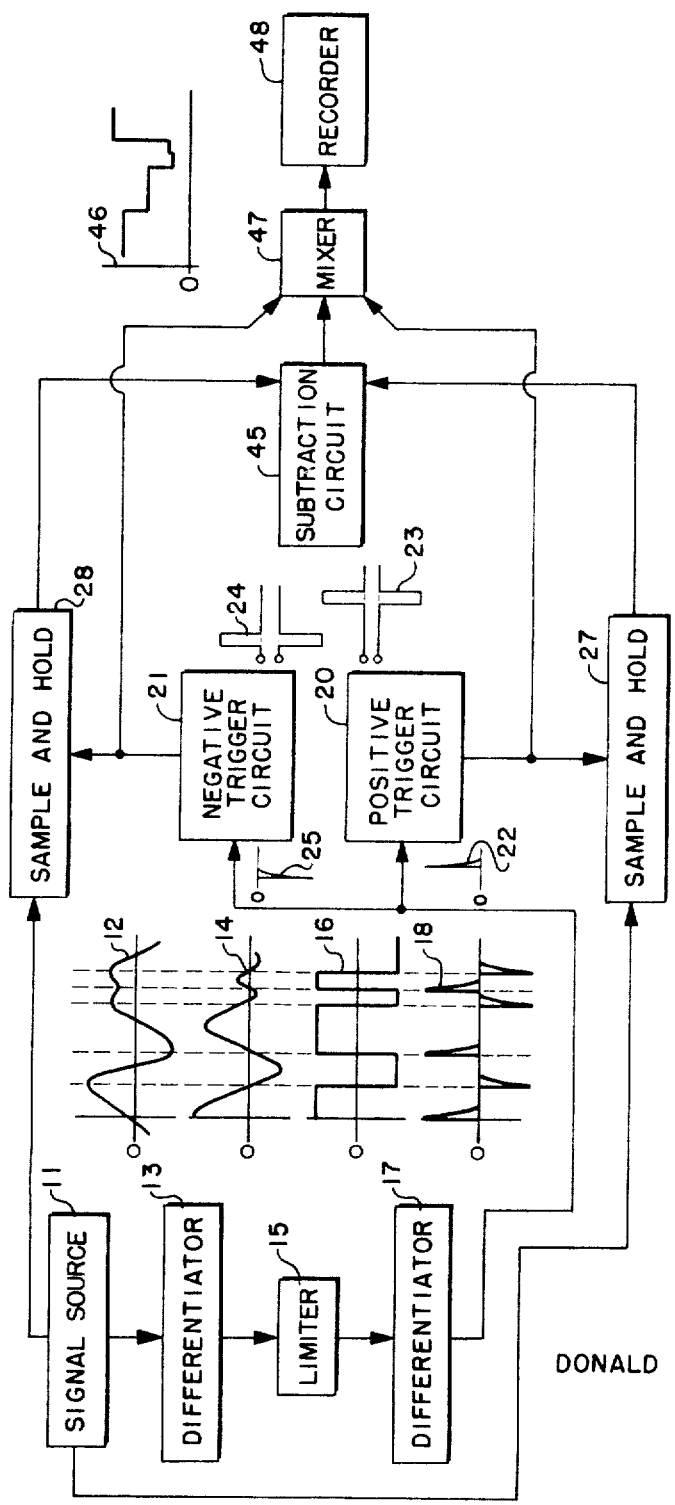
FIGURE 1 is a schematic diagram of apparatus useful in practicing the invention.

Turning now to FIGURE 1 of the drawing, reference numeral 11 designates a seismic signal source. Seismic signals obtained in the field are normally recorded on magnetic tape and later reproduced and amplified to permit the preparation of multiple trace records which can be analyzed and interpreted. In most cases source 11 will therefore comprise a magnetic tape playback system including a suitable amplifier. In some instances, however, the signal utilized may be taken directly from a geophone or a similar seismic detector and amplified to the desired level. The seismic signal derived from source 11 is normally of an essentially sinusoidal character as indicated by waveform 12. This signal is fed to a differentiator 13 whose output is proportional to the derivative or rate of change of the input signal as shown by waveform 14. Any of a variety of conventional differentiators may be utilized. Suitable circuits are described by Chance et al. in "Waveforms," published as volume 19 of the Massachusetts Institute of Technology Radiation Laboratory Series by McGraw Hill Book Company of New York in 1949, and elsewhere in the patent and technical literature. The differentiated signal from circuit 13 is applied to a limiter 15 in which an output signal having constant amplitudes for all values above or below predetermined values is generated. This output signal is indicated by waveform 16 in FIGURE 1. Again a conventional circuit may be used. Suitable limiters are described in "Waveforms," referred to above. The rectangular pulses obtained from the limiter are fed to a second differentiator circuit 17 where the derivative of the pulses is taken. This results in the production of sharply-peaked pulses at zero values of the signal applied to the second differentiator. These pulses have positive values at points where the signal from the limiter is changing from a negative to a positive value and negative values at points where the limiter output signal is changing from a positive to a negative value. This is indicated by waveform 18 in FIGURE 1. Differentiator 17 may be of the same type as differentiator 13 described earlier.

The positive and negative pulses obtained from the second differentiator referred to in the preceding paragraph are utilized to actuate one-shot multivibrators or similar trigger circuits 20 and 21 and thus produce control or gating pulses. The multivibrators are conventional capacitatively-coupled relaxation oscillators arranged so that the circuitry is in an unoscillating state and an input pulse is required to initiate each cycle of operation. Such multivibrators, also frequently referred to as "one-shots" or "flip-flops" are well known circuits and will be familiar to those skilled in the art. Other circuits which will accomplish the same purpose, phantastrons, blocking oscillators and the like, may also be used. The multivibrators, blocking oscillators or similar devices employed may have reset periods ranging from as little as 1/10 of a millisecond up to as high as 5 milliseconds. Since the reset or delay period of the multivibrators must be shorter than the period between the sharply-peaked pulses used to trigger them, the exact period will depend in part upon the characteristics of the input seismic signal from which the sharply-peaked pulses are derived. In general it is preferred to employ multivibrators having delay or reset periods of about 1 to about 3 milliseconds. As indicated by the waveforms in FIGURE 1, multivibrator 20 is triggered by a sharply-peaked positive pulse 22 from differentiator 17 and produces simultaneous positive and negative control pulses of somewhat greater amplitude as shown by waveforms 23. In similar manner, simultaneous positive and negative control pulses as indicated by waveforms 24 are produced by multivibrator 21 in response to sharply-peaked negative pulses 25 from the differentiator. The multivibrators thus operate alternately at points corresponding to maximum and minimum values in the input seismic signal.

The control pulses derived from multivibrator or trigger circuit 20 as described above are utilized to actuate a sample-and-hold circuit 27 to which the input seismic signal from source 11 is applied. The sample-and-hold circuit samples the voltage in the applied seismic signal in response to control pulses from multivibrator 20 and holds the sample voltage constant until later pulses are received from the multivibrator. A second sample is then taken and held until still later control pulses arrive. The output signal from the sample-and-hold circuit is thus a rectangular waveform characterized by successive amplitude values corresponding to successive positive peaks in the input seismic signal. In like manner, sample-and-hold circuit 28 is actuated by control pulses from multivibrator or trigger circuit 24 and samples the signal from source 11 to produce a rectangular waveform in which successive amplitude values correspond to successive negative peaks in the input seismic signal.

Figure 2:
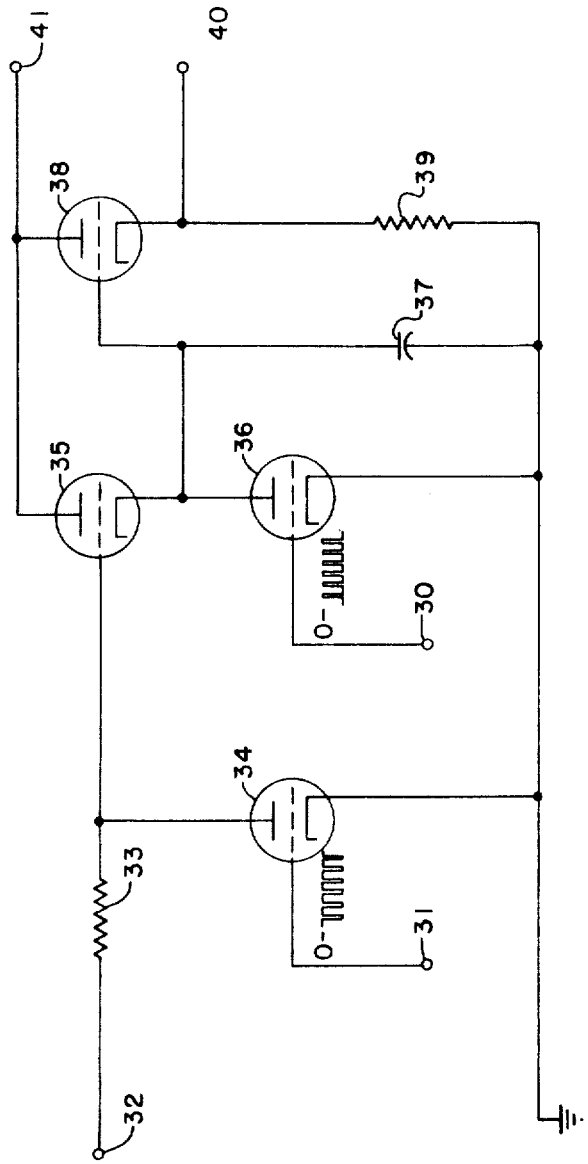
FIGURE 2 is a circuit diagram of a sample-and-hold circuit suitable for use in the apparatus of the invention.

A number of different sample-and-hold circuits capable of sampling an input signal in response to control pulses and holding the voltage constant until another sample is taken in response to later control pulses may be utilized. FIGURE 2 of the drawing depicts one circuit suitable for this purpose. The circuit shown includes four triodes, two resistors and a capacitor connnected to form two cathode follower stages. Two of the triodes could readily be replaced by diodes and appropriate control circuitry. Semiconductors might also be employed in place of the electron tubes. The sampling action of the sample-and-hold circuit depicted is initiated by the simultaneous application of positive and negative control pulses from the appropriate multivibrator to positive control terminal 30 and negative control terminal 31. The input seismic signal from pulse source 11 in FIGURE 1 of the drawing is fed to the sample-and-hold circuit through input terminal 32. This signal is applied through resistor 33 to the plate of triode 34 and the grid of triode 35. The grid and cathode of triode 34 are connected to negative control terminal 31 and ground respectively. The cathode of triode 35 is connected to the plate of triode 36 which serves as a cathode resistor. The grid and cathode of triode 36 are connected to positive control terminal 30 and the common ground respectively. Condenser 37 is located between ground and the cathode of tube 35 and between ground and the grid of triode 38. The cathode of this latter tube is connected through resistor 39 to the common ground and is also connected to an output terminal 40. The plates of triodes 35 and 38 are connected to positive potential terminal 41.

Prior to the sampling operation in the circuitry shown in FIGURE 2 of the drawing, triodes 35 and 36 are held in a cut-off state, triode 35 by the voltage drop across resistor 33 due to current flow through triode 34 and triode 36 by the potential at terminal 30. The triode 38 provides a low impedance replica of the voltage on storage condenser 37. When control pulses from the multivibrator arrive at terminals 30 and 31, triode 34 is cut off, allowing the voltage on the grid of tube 35 to rise to the level of the input seismic signal. Simultaneously, triode 36 is energized, providing a cathode resistor for triode 35. Storage capacitor 37 is therefore charged to the new signal level. Immediately after the charge is stored on the capacitor, triode 34 is de-energized and triode 36 is cut off. This leaves the capacitor 37 free, holding the grid of triode 38 at the signal level. Triode 38 with cathode resistor 39 provides a low impedance output source at terminal 40 for the storage capacitor signal. The output signal from the sample-and-hold circuit is thus a rectangular waveform whose amplitude values remain constant over intervals determined by the frequency of the pulses from the multivibrators or other circuits used for control purposes. It will be recognized, of course, that other sample-and-hold circuits which operate in a similar manner to produce such a waveform may be utilized in lieu of the specific circuit described.

The output signals from sample-and-hold circuits 27 and 28 in FIGURE 1 of the drawing are fed to a subtraction or difference circuit 45 where one is subtracted from the other. Any of several conventional subtraction or comparator circuits may be employed. Suitable circuits are described and illustrated in "Waveforms" and elsewhere in the prior art. The output signal from the subtraction circuit consists of a rectangular waveform characterized by constant amplitude values over half-cycle intervals of the input seismic signal, as indicated by waveform 46. The amplitude during each of these intervals is proportional to the difference in amplitude between the positive or negative peak at a corresponding point in the input seismic signal and the preceding negative or positive peak in the input signal. This output signal may be applied to a conventional variable density, variable color or similar recorder 48 for the preparation of a trace of uniform width on which changes in amplitude are shown by changes in trace quality. An alternate procedure is to apply the signal from the subtraction circuit to a mixer or adder circuit 47 with the control pulses generated by trigger circuits 20 and 21. Conventional adding or mixing circuits may be employed. This results in narrow peaks in amplitude at half-cycle intervals in the output signal. These appear as fine lines separating the intervals of constant amplitude on a record subsequently produced by applying the signal to a variable density or variable color recording device.

FIGURE 3 of the drawing depicts waveforms and a variable color trace prepared in accordance with the invention. Waveform A in FIGURE 3 represents the input seismic signal obtained from source 11 of FIGURE 1. It will be noted that this waveform is essentially sinusoidal in character and includes alternate positive and negative peaks. Each cycle of the signal extends from one positive peak to the following positive peak. Waveform B in FIGURE 3 represents the output signal obtained from subtraction circuit 45 in FIGURE 1 of the drawing. This signal is made up of increments of uniform amplitude extending over half-cycle intervals in the original signal shown above it. The amplitude of each increment corresponds to the difference between the amplitude of the positive peak at the beginning of the increment and that of the preceding negative peak. Colors which might be employed in preparing a variable color trace from this waveform are indicated at the left of the waveform. In a typical color recording system, differences in amplitude are indicated by changes in color obtained by reflecting light from a galvanometer mirror through a light filter containing color bands extending parallel to the axis of rotation of the mirror. The color recorded on the photographic film or paper employed depends upon the extent to which the mirror is deflected from its neutral position and hence upon the amplitude of the signal applied to the galvanometer. Each color thus represents an amplitude value within a predetermined range. A recording system including such a galvanometer and color filter is shown in U.S. Patent 3,011,956 of Palmer et al., issued on December 5, 1961. The shading on the trace C represented in FIGURE 3 indicates the colors of the trace. It will be noted that each increment of uniform amplitude in waveform B is represented by a band of uniform color on the trace and that the transition between colors is abrupt, rather than gradual. This permits small changes in amplitude such as the amplitude notch indicated by reference numeral 50 in waveform A to be readily detected. If the trace shown were one prepared with a variable density recorder such as that described in the Palmer et al. patent the half-cycle increments would appear as bands of black, white or gray. In each case the contrast would be much greater than on a conventional variable density record and hence small changes in amplitude could be detected more readily than might otherwise be the case.

As pointed out earlier, the control pulses from multivibrators or similar trigger circuits 20 and 21 may be combined with the signal from subtraction circuit 45 in FIGURE 1 of the drawing and recorded if desired. This results in the presence of narrow lines at half-cycle intervals in a variable color or variable density record prepared in accordance with the invention. These lines will be of uniform color or intensity because the control pulses are of uniform amplitude. The presence of such lines is sometimes helpful in instances where the frequency as well as the amplitude of the recorded signal is of interest. This and other modifications of the invention will be apparent to those skilled in the art.

What is claimed is:

1. Apparatus for facilitating the detection of changes in amplitude in an electrical signal which comprises a signal source, means connected to said source for generating control pulses at points coinciding with peaks in amplitude in a signal from said source, means connected to said source and responsive to said pulses for generating a first rectangular waveform having amplitude values proportional to the amplitudes of successive positive peaks in amplitude in said signal, means for generating a second rectangular waveform having amplitude values proportional to the amplitudes of successive negative peaks in amplitude in said signal, and means for recording the difference between said first and second rectangular waveforms.

2. Apparatus for recording seismic information which comprises a seismic signal source, means connected to said source for generating a first series of control pulses at points coinciding with positive peaks in amplitude in a seismic signal from said source and for generating a second series of control pulses at points coinciding with negative peaks in amplitude in said seismic signal, means connected to said source and responsive to said first series of control pulses for sampling and holding successive positive peaks in amplitude in said signal, means connected to said source and responsive to said second series of control pulses for sampling and holding successive negative peaks in amplitude in said signal, means for subtracting voltages obtained by sampling and holding said negative peaks in amplitude from voltages obtained by sampling and holding said positive peaks in amplitude, and means for recording the differences between said voltages.

3. Seismic recording apparatus which comprises a seismic signal source, means connected to said source for generating a first series of control pulses coinciding with positive peaks in amplitude in a seismic signal from said source, means connected to said source for generating a second series of control pulses coinciding with negative peaks in amplitude in said signal from said source, a first sampling means connected to said source and responsive to said first series of control pulses for sampling the voltage of said seismic signal at points coinciding with positive peaks in amplitude and holding each sample voltage constant until the next succeeding sample is taken, a second sampling means connected to said source and responsive to said second series of control pulses for sampling the voltage of said seismic signal at points coinciding with negative peaks in amplitude and holding each sample voltage constant until the next succeeding sample is taken, means for subtracting the output of said second sampling means from the output of said first sampling means, and means for recording the difference between the output of said first and second sampling means.

4. Apparatus as defined by claim 3 wherein said means for recording the difference between the outputs of said first and second sampling means comprises a variable color recorder.

5. Apparatus as defined by claim 3 wherein said means for recording the difference between the outputs of said first and second sampling means comprises a variable density recorder.

6. Seismic recording apparatus which comprises a seismic signal source, means for generating a first series of control pulses coinciding with positive peaks in amplitude in a seismic signal from said source, means for generating a second series of control pulses coinciding with negative peaks in amplitude in said seismic signal, a first sampling means responsive to said first series of control pulses for sampling the voltage of said seismic signal at points coinciding with positive peaks in amplitude in said signal and holding each sampled voltage constant until the next succeeding sample is taken, a second sampling means responsive to said second series of control pulses for sampling the voltage of said seismic signal at points coinciding with negative peaks in amplitude in said signal and holding each sampled voltage constant until the next succeeding sample is taken, subtracting means for obtaining the difference between the output of said first sampling means and the output of said second sampling means, mixing means for combining the output from said subtracting means with said first series of control pulses and said second series of control pulses, and means for recording the output signal obtained from said mixing means.

7. Seismic recording apparatus which comprises a seismic signal source, a first differentiator in series with said source, a limiter in series with said first differentiator, a second differentiator in series with said limiter, a first trigger circuit connected to the output from said second differentiator, a second trigger circuit connected to the output of said second differentiator, a first sample-and-hold circuit connected to said signal source and responsive to pulses from said first trigger circuit, a second sample-and-hold circuit connected to said signal source and responsive to pulses from said second trigger circuit, a subtraction circuit connected to said first and second sample-and-hold circuits, and a recorder connected to the output of said subtraction circuit.

8. A method for indicating changes in amplitude in a random electrical signal which comprises detecting positive and negative peaks in amplitude in said random signal, generating a rectangular waveform having amplitude values proportional to the difference between adjacent positive and negative peak values in said signal, and recording said rectangular waveform as a trace of uniform width on which changes in amplitude are indicated by changes in trace quality.

9. A method for displaying seismic information which comprises detecting positive and negative peaks in amplitude in an input seismic signal, generating a first rectangular waveform having amplitude values proportional to positive peak values in said input signal, generating a second rectangular waveform having amplitude values proportional to negative peak values in said input signal, and recording differences in amplitude between said first and second rectangular waveforms as a trace of uniform width on which changes in amplitude are indicated by changes in trace quality.

References Cited by the Examiner

UNITED STATES PATENTS

| | | | |
|---|---|---|---|
| 2,940,061 | 6/1960 | Piety | 340—15.5 |
| 2,991,446 | 7/1961 | Loper | 340—15.5 |
| 3,051,897 | 8/1962 | Peterson et al. | 324—77 |
| 3,058,110 | 10/1962 | Burns et al. | 340—15.5 |
| 3,063,014 | 11/1962 | Shanks | 340—15.5 |
| 3,070,776 | 12/1962 | Burns | 340—15.5 |

BENJAMIN A. BORCHELT, *Primary Examiner.*

CHESTER L. JUSTUS, SAMUEL FEINBERG,
*Examiners.*

R. M. SKOLNIK, W. KUJAWA, *Assistant Examiners.*